United States Patent
King, Jr. et al.

(10) Patent No.: US 7,698,491 B1
(45) Date of Patent: Apr. 13, 2010

(54) MODULAR PATCH PANEL WITH PLUGGABLE PERSONALITIES

(75) Inventors: Joseph P. King, Jr., Sterling, MA (US); William Brian Cunningham, Westborough, MA (US); Ilhan Gundogan, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 166 days.

(21) Appl. No.: 11/861,636

(22) Filed: Sep. 26, 2007

(51) Int. Cl.
*G06F 13/36* (2006.01)

(52) U.S. Cl. .................. 710/306; 312/223.1; 312/223.2; 361/600; 361/775; 361/784; 361/792; 361/788; 361/796; 361/797; 174/50

(58) Field of Classification Search ................. 710/306; 312/223.1, 223.2; 361/600, 760, 761, 770, 361/772, 775, 784, 785, 790, 792, 788, 796, 361/797; 174/50, 50.52
See application file for complete search history.

(56) References Cited

U.S. PATENT DOCUMENTS

| | | | |
|---|---|---|---|
| 4,723,195 A * | 2/1988 | Mizzi et al. ................. 361/729 |
| 5,991,844 A * | 11/1999 | Khosrowpour .............. 710/312 |
| 6,308,255 B1 * | 10/2001 | Gorishek et al. ............ 712/209 |
| 6,356,959 B1 * | 3/2002 | Thomas et al. ................. 710/2 |
| 6,525,273 B1 | 2/2003 | Cunningham |
| D486,494 S | 2/2004 | Gundogan et al. |
| D496,050 S | 9/2004 | Gundogan et al. |
| 6,826,057 B1 | 11/2004 | Gundogan et al. |
| 7,004,764 B2 | 2/2006 | Boudreau et al. |
| 7,069,369 B2 * | 6/2006 | Chou et al. ................. 710/301 |
| 7,134,902 B1 | 11/2006 | Lewis et al. |
| 7,155,546 B2 * | 12/2006 | Seto ............................ 710/100 |
| 7,222,983 B1 | 5/2007 | Gundogan et al. |
| 7,269,467 B2 * | 9/2007 | Schildknecht ................ 700/60 |
| 7,372,693 B1 | 5/2008 | Feroli et al. |
| 7,418,038 B2 * | 8/2008 | Kikuchi ...................... 375/257 |
| 7,425,685 B1 | 9/2008 | Gundogan et al. |
| 7,483,268 B1 | 1/2009 | King, Jr. et al. |

(Continued)

OTHER PUBLICATIONS

Intel Corporation. Intelligent Chassis Management Bus (ICMB) Bridge Card. Technical Product Specification. Revision 1.0. Feb. 17, 2000.*

(Continued)

*Primary Examiner*—Mark Rinehart
*Assistant Examiner*—Matthew D Spittle
(74) *Attorney, Agent, or Firm*—BainwoodHuang

(57) ABSTRACT

A modular patch panel for interconnecting a data storage system controller to data storage enclosures is provided. The modular patch panel includes a chassis and modular interface circuitry. The chassis has a front end and a back end, the front end and the back end being horizontally opposed, the back end attaching to a panel portion of a rack system, the panel portion electrically connecting to the data storage enclosures over a set of point-to-point connections. The modular interface circuitry has (a) a data storage interface portion electrically connected to the set of point-to-point connections through the panel and (b) a controller interface portion electrically connecting to the data storage system controller through the front end. The modular interface circuitry is interchangeable through an opening in the front end. It is also constructed and arranged to manage digital communications between the data storage system controller and the data storage enclosures according to a data storage system protocol used by the data storage system controller.

20 Claims, 12 Drawing Sheets

U.S. PATENT DOCUMENTS

| | | |
|---|---|---|
| 7,573,726 B1 | 8/2009 | Cote et al. |
| 2006/0150458 A1 | 7/2006 | Feroli et al. |
| 2008/0080146 A1 | 4/2008 | King et al. |

OTHER PUBLICATIONS

Aurora Technologies. XP-7R Expansion Chassis. User's Guide. Rev. C. Jun. 2002.*

Digidesign. PCIe-to-PCIe Expansion Chassis. User Guide. 2008.*

Intel Corporation. Balanced Technology Extended (BTX) Chassis. Design Guidelines. Revision 1.1. Feb. 2007.*

Ralph C. Frangioso, Jr. and Robert Wierzbicki, "Connection Assembly Having Midplane With Enhanced Connection and Airflow Features," U.S. Appl. No. 11/862,800, filed Sep. 27, 2007.

* cited by examiner

MODULAR PATCH PANEL WITH PLUGGABLE PERSONALITIES

FIELD OF THE INVENTION

Embodiments of the present invention relate generally to data storage systems. More particularly, embodiments of the present invention relate to high-density data storage system architectures.

BACKGROUND

Enterprises in the data storage industry perpetually face demand from their customers to produce storage solutions that achieve ever-increasing data storage density. One approach is to include multiple disk drives on a single carrier. This increased data storage density on a carrier translates into greater data storage density for disk drive enclosures that can house several of such carriers. However, a competing demand is to provide individual serviceability, not only to each disk drive enclosure, but also to each disk drive within the enclosure. Individual serviceability enables field service personnel to remove and replace a failing disk drive without affecting the operation of working drives.

SUMMARY

Typical rack-based systems have a multiplicity of cable connections, cables extending from each device within the rack through an opening in the rack towards the data storage system controller. Unfortunately, it is easy for these cables to get mixed up, and this makes it difficult to set-up and maintain the system. It also makes it difficult to change the type of protocols used by the system, because often the cables must be replaced and reconnected.

Thus, embodiments of the invention are directed towards high density rack systems for storing large numbers of data storage enclosures with cable management features. Thus, embodiments of the system include a modular patch panel for receiving the data cables from the data storage enclosures. Even though in some embodiments data storage enclosures are provided on both sides of the rack, with only a small central chimney between the front and rear enclosures, the connection of cables is simplified because the cables can be pre-wired from each position in the rack to a connector panel at the base of the system. A modular patch panel attaches to this connector panel and includes modular circuitry which aggregates the signals from the various cables and places it into an appropriate format for communication with the data storage system controller. Even if the protocols change, the cables need not be reconfigured; only the modular circuitry within the modular patch panel (and possibly the link control cards within the data storage enclosures) may need to be replaced.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments are rack-mounted systems that have modular data storage enclosures that install from the front and from the rear of the rack. Pairs of data storage enclosures are accordingly "back-to-back" within the rack (i.e., the back of one enclosure faces the back of the enclosure directly opposite). The back-to-back configuration achieves higher disk drive density than conventional front-only data storage systems, while granting individual frontal access to each data storage enclosure for serviceability, either from the front or from the rear of the rack.

Each data storage enclosure electrically plugs into a pair of central spines, herein also referred to as cable conduits, and exhausts air through a central chimney (i.e., air plenum). The central spines route the cabling from the data storage enclosures at an upper region of the data storage system to a midplane (note that this midplane may alternately be referred to as a connector panel or a panel) located at a lower region of the data storage system. Movably coupled to the central spines are electrical cable assemblies for making electrical connections to an electrical plug and to an electrical signal connector of the data storage enclosure. The movable coupling enables the electrical cable assemblies of the spine to move slightly in order to facilitate blind mating and hot plugging between the data storage chassis and the spines.

Figure 1:
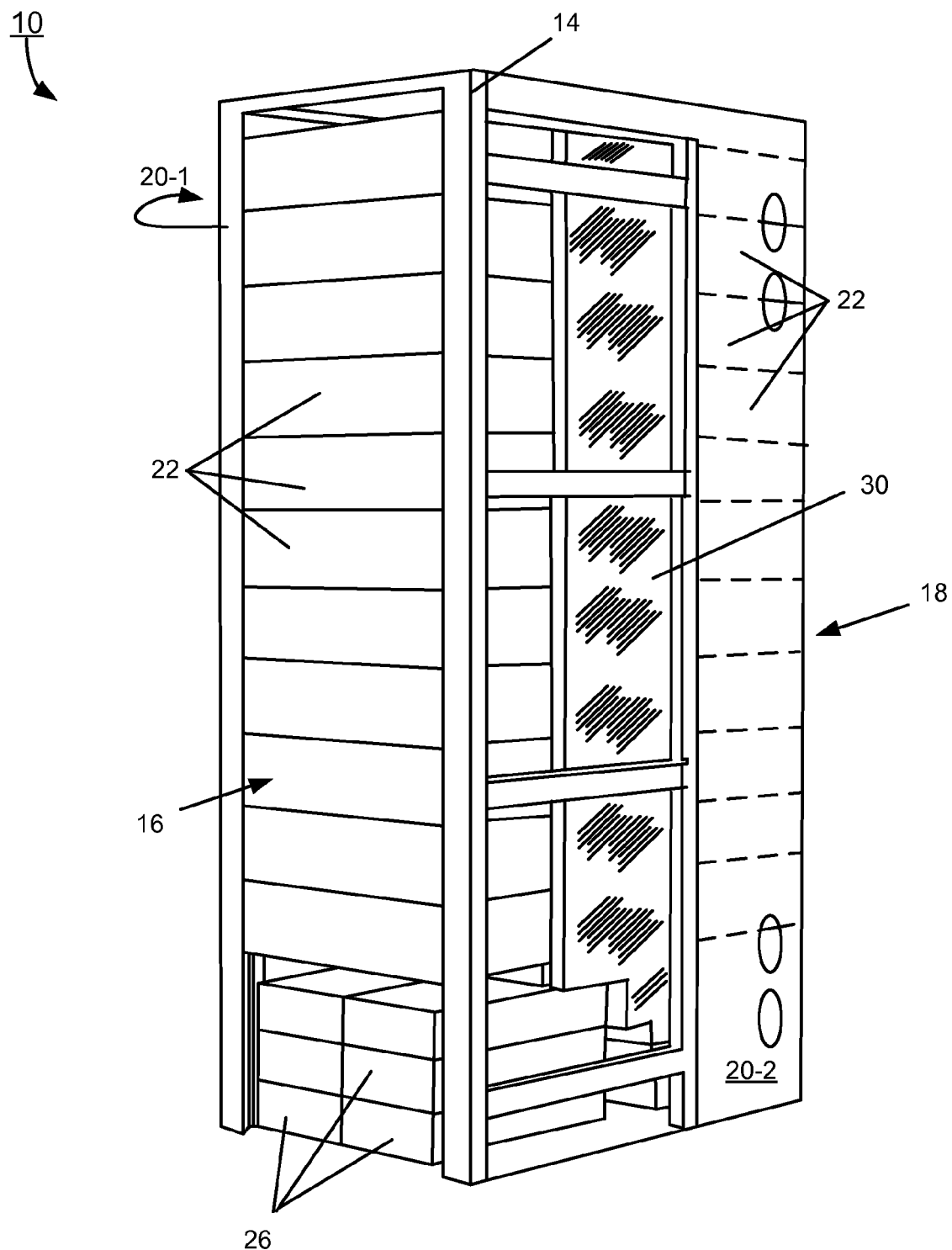
FIG. 1 is a schematic diagram of a data storage system constructed in accordance with embodiments the invention.
Figure 2:
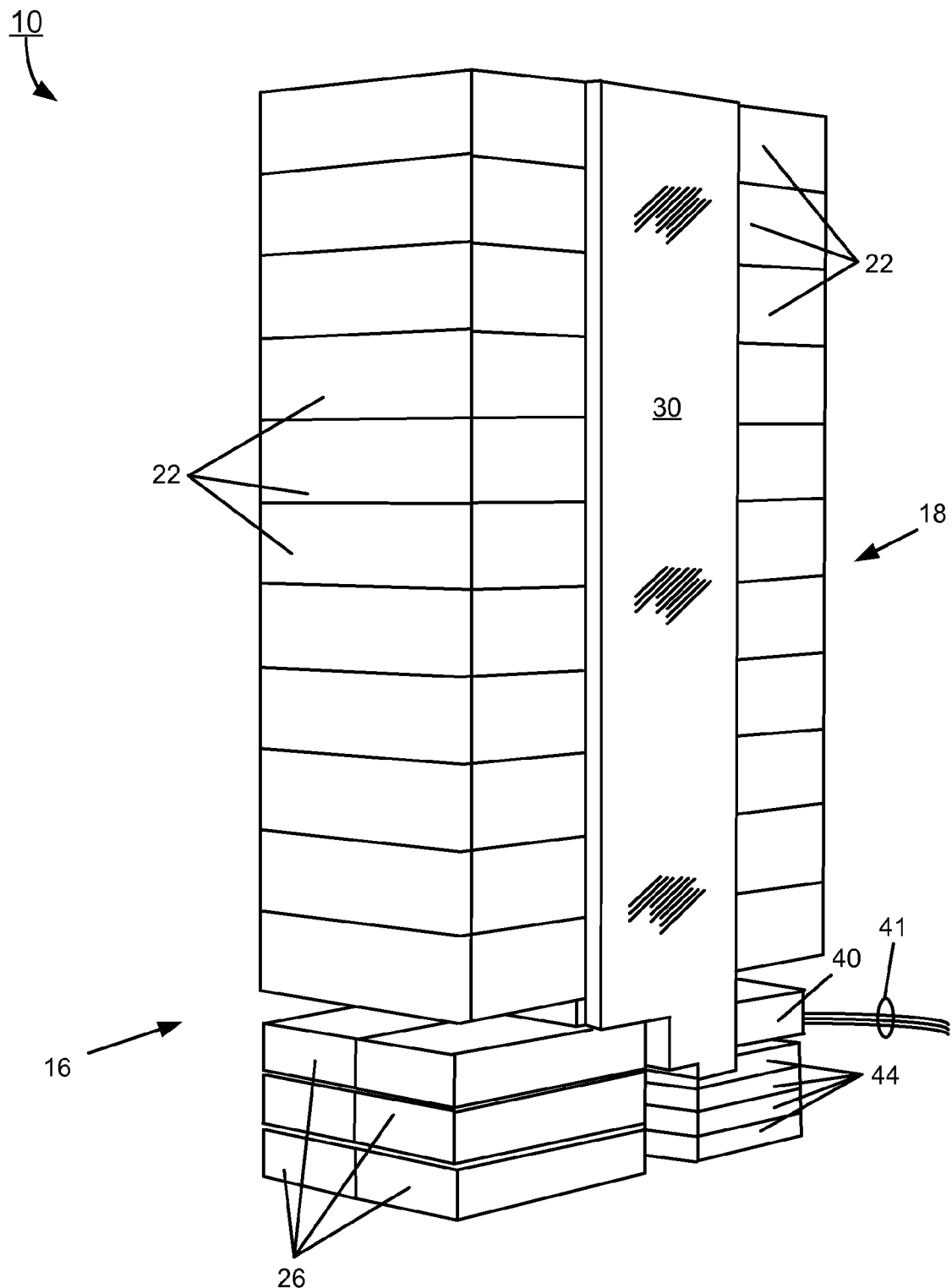
FIG. 2 is a schematic diagram of the data storage system of FIG. 1, without a rack structure.

Referring to FIG. 1 and FIG. 2, shown is an example embodiment of a data storage system 10. The data storage system 10 includes a rack 14 having a front side 16, a rear side 18, and opposing sidewalls 20-1, 20-2. In FIG. 2, the rack 14 is missing from FIG. 1 to illustrate more clearly the various internal features of the data storage system 10. In one embodiment, the rack 14 is constructed of sheet metal and has a 24"

width, a 39" length, and a 42 U height (1 U is equal to 1.75 inches). Other embodiments of racks may have different heights, widths, and depths.

Mounting or guide rails (not shown) define front compartments for guiding and supporting chassis installed through the front side 16 and rear compartments for guiding and supporting chassis installed through the rear side 18. The placement of such rails can vary during system manufacture to accommodate the varying sizes (e.g., 3 U, 2 U, etc.) of chassis used to populate the data storage system 10. Accordingly, as used herein, a compartment describes a position in the rack configured for receiving a chassis. Mounting rails, doors, cover, floor, and side panels of the data storage system 10 are not shown to simplify the illustration.

Installed within the rack 14 are front-side data storage enclosures (DSEs) 22, also called disk array enclosures or chassis, rear-side DSEs 22 (shown in dashed lines in FIG. 1), a plurality of power supplies 26, a first vertical spine 30 located adjacent the sidewall 20-2, a second vertical spine located adjacent the sidewall 20-1 (both not visible), a modular patch panel 40 (FIG. 2), and a plurality of power regulators 44 (FIG. 2). A general reference to a chassis, as used herein, can refer to any one or more of the DSEs 22, power supplies 26, modular patch panel 40, and power regulators 44. Each chassis 22, 26, 40, 44 is a field replaceable unit (FRU) and is individually serviceable from its front end when installed in the rack 14.

In the data storage system 10, the DSEs 22 are modular, each having a plurality of redundant disk drives (divided into side A and side B), a front side, a rear side, rear cabling, and front-to-rear cooling. At the rear of each DSE 22 are an electrical signal connector and electrical plug that "hot" plug into respective cable assemblies on the vertical spines 30, as described in more detail below. For some embodiments of DSEs 22, the disk drives are individually serviceable within the DSE. In one embodiment, each DSE 22 has a 3 U height and 12" depth.

In FIG. 1 and FIG. 2, the front and rear compartments reserved for DSEs are fully populated: on the front side 16, a first stack of DSEs 22 is disposed above the power supplies 26; at the rear side 18, a second stack of DSEs 22 is disposed above the modular patch panel 40 and power regulators 44. A gap (approx. 1 U) separates each stack of DSEs from the modular patch panel 40 or power supplies 26. Although shown fully populated with DSEs 22, the data storage system 10 can operate with as few as a single DSE 22. The modular construction of the data storage system 10 and its various FRUs allows the addition of DSEs 22 on an as-needed basis.

The modular patch panel 40 is an individual chassis having various modules for defining the functional behavior of the data storage system 10. Depending upon the particular types of modules in use, the DSEs 22 of the data storage system 10 can operate as different kinds of network systems (for example, as a Network Application Storage system, as a Storage Area Network, or as a combination thereof) over different kinds of topologies (for example, point-to-point connections, looped connections, etc.). Egress and ingress of communication signals out of and into the data storage system 10 is through the modular patch panel 40 over cabling 41. Depending upon the particular types of modules in use, the cabling 41 (and low-level operation of the system) can vary (for example, SAS, fibre, Ethernet, etc.). A source of power can enter the data storage system 10 from below (e.g., into the power regulators 44).

Figure 3:
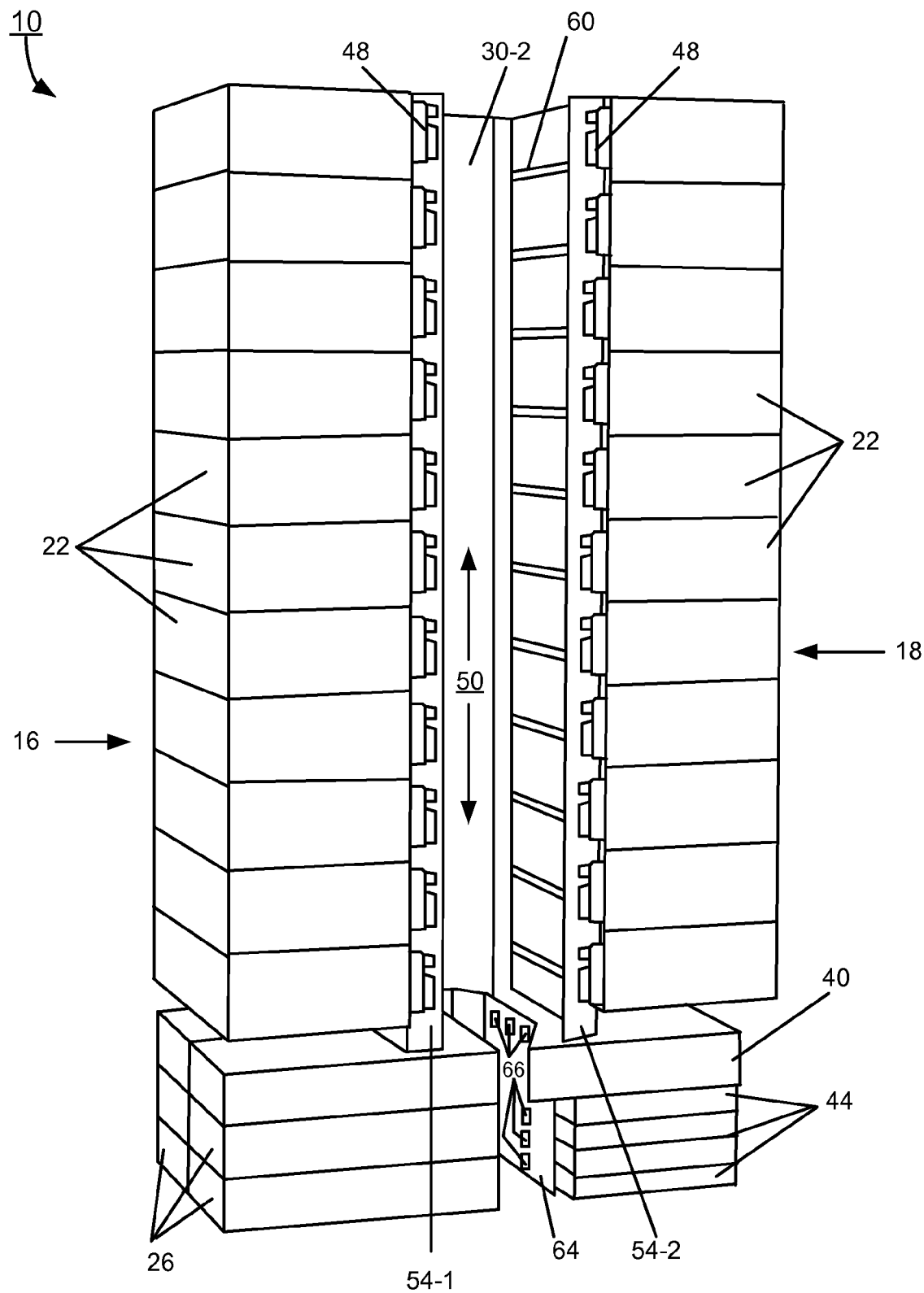
FIG. 3 is a schematic diagram of the data storage system of FIG. 2, with a vertical spine (also referred to as a cable conduit) removed to expose interior features of the system.

FIG. 3 shows a side view of the data storage system 10 with the spine 30 removed to reveal a central chimney (or air plenum) 50 defined on two sides by opposing spatially separated interior panels 54-1, and 54-2. The bases of the interior panels 54-1, 54-2 abut the top surfaces of power supplies 26 and of the patch panel 40, respectively. Also revealed are external DSE connector assemblies 48 extending from the rear side of each DSE 22, a second vertical spine 30-2 at the opposite sidewall of the rack 14 disposed between the interior panels 54-1, 54-2, and baffles 60 on the interior panel 54-2. The other interior panel 54-1 has similar baffles, one for each DSE 22, although not visible in FIG. 3. As used herein, a DSE connector assembly 48 is considered to include an electrical plug and an electrical signal connector, although such electrical components may be structurally and functionally separate and not part of the same structure.

Also shown, the modular patch panel 40 includes a connector panel 64 extending downwards generally orthogonal from the rear side of the modular patch panel 40. The connector panel 64 extends downwards behind and between the power supplies 26 and power regulators 44. Power and communication signals pass to and from the connector panel 64, which functions to route power and such signals from source to destination. Electrical connector assemblies 66, of which a representative number are shown, are on each side of the connector panel 64. The power supplies 26 and power regulators 44 connect from opposite sides to the connector panel 64 through some of these connector assemblies 66. DSEs 22 connect to the connector panel 64 through others of these connector assemblies 66, as described in connection with FIG. 5.

Figure 4:
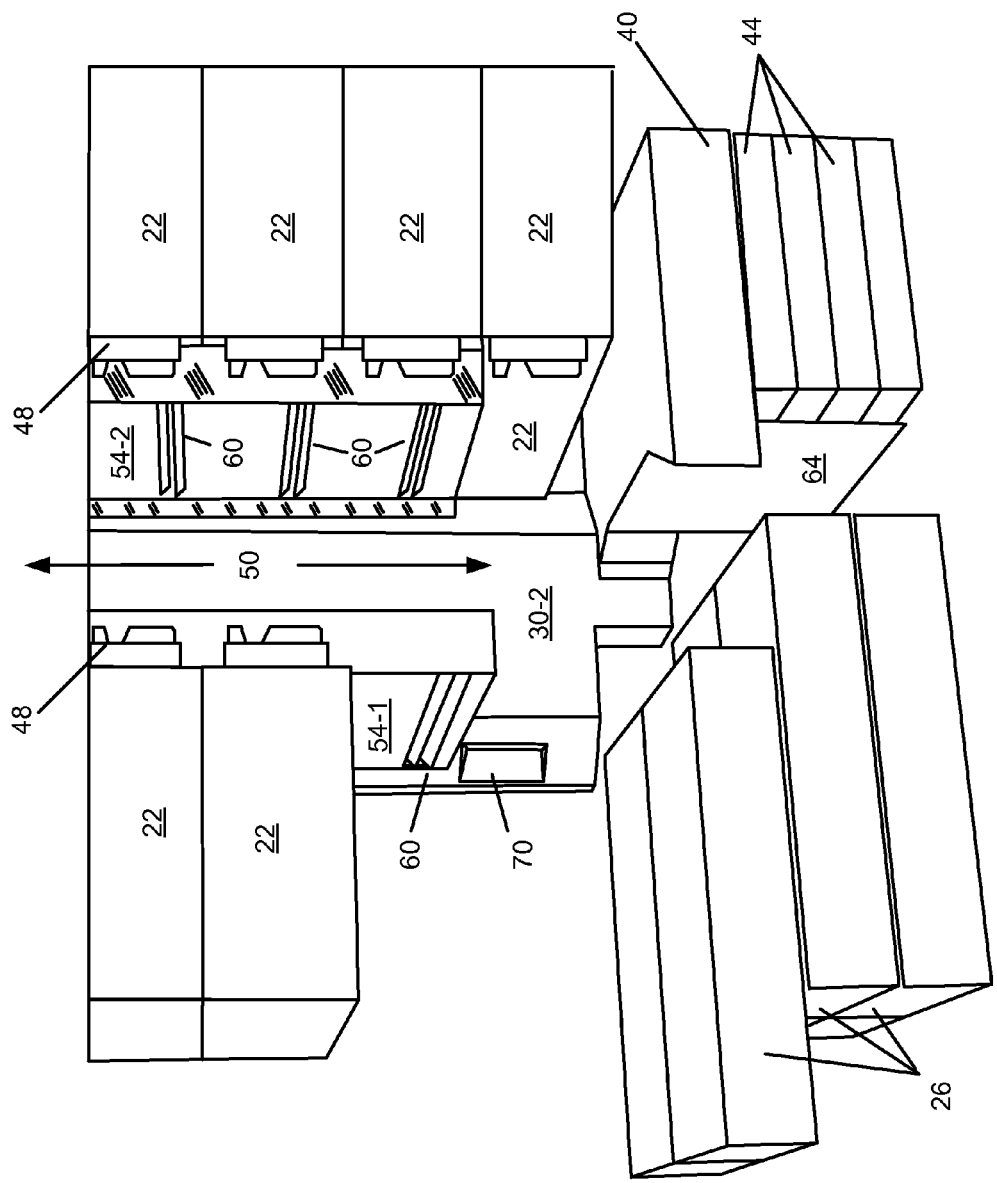
FIG. 4 is a schematic diagram of a lower region of the data storage system, with power supplies and internal panels partially removed to expose additional details of interior features of the system.

FIG. 4 shows a side view of a lower region of the data storage system 10 of FIG. 3, from which the spine 30, lower sections of interior panels 54-1, 54-2, and two DSEs 22 are removed in order to reveal the spine 30-2 and baffles 60 in more detail. In this embodiment, the spine 30-2 has a recessed region 70 into which a connector assembly 48 can extend from the rear of the DSE 22 can enter (for engaging a corresponding connector assembly of the spine 30-2, not shown).

Figure 5:
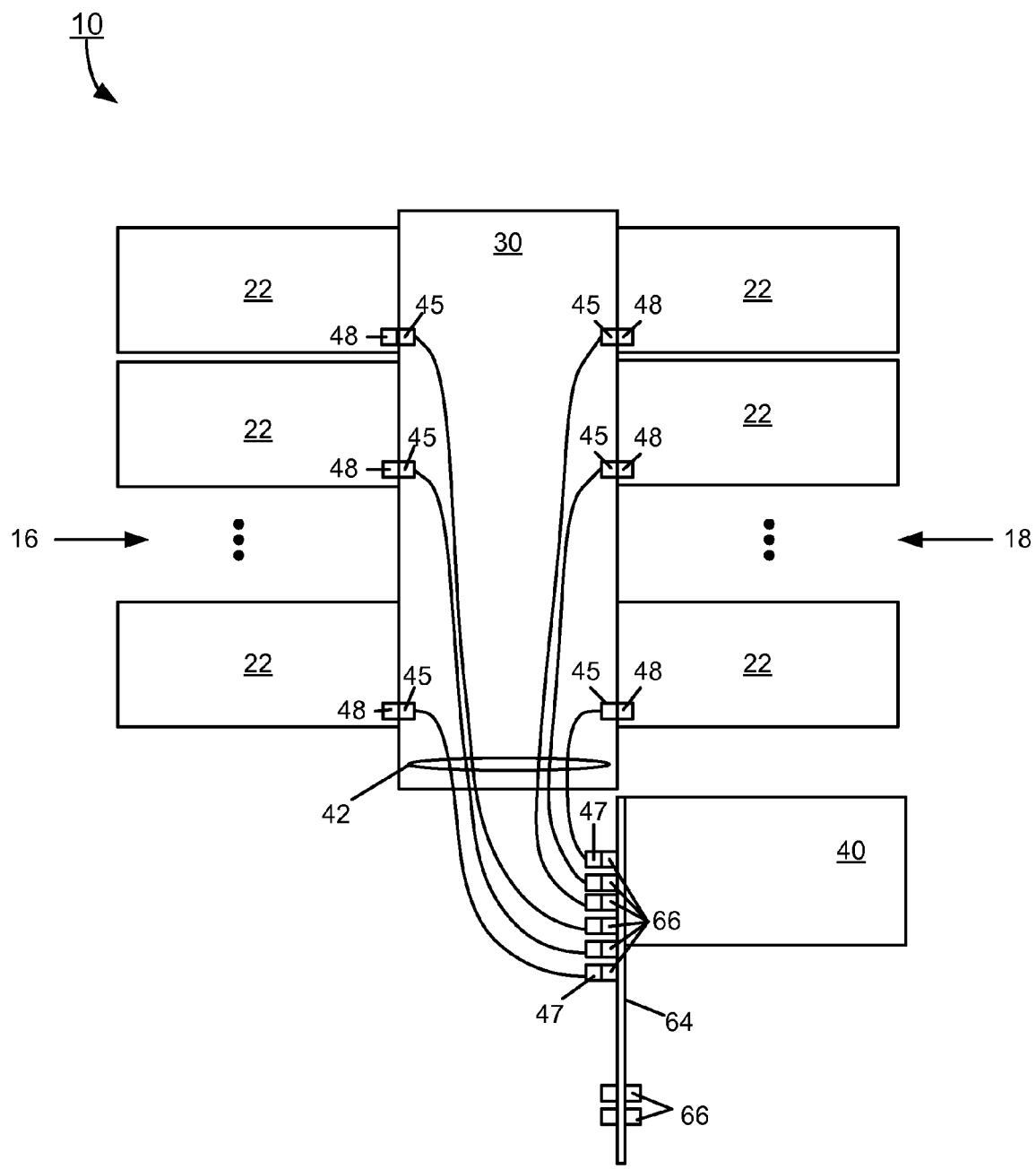
FIG. 5 is a side view of an illustrative portion of the data storage system, with back-to-back data array enclosures electrically connected to a midplane (or connector panel) by way of cables that traverse through a vertical spine.

FIG. 5 shows a side view of the data storage system 10 including a plurality of front-side DSEs 22 and rear-side DSEs 22 plugged into the spine 30. The connections to the spine 30 are representative of similar connections by the DSEs 22 to the other spine 30-2. To simplify the illustration, the power supplies 26, power rectifiers 44, and many of the DSEs 22 are missing from the figure.

Each spine 30 is comprised of passive components: cables (wires) 42, connector assemblies 45, metal, and plastic. For serviceability, the spines 30 can have side access panels. Preinstalled, permanently mounted to the rack 14 (not shown), and pre-wired with cables (or wires) 42, each vertical spine 30 is in general a conduit for cables 42 that conduct communication (e.g., I/O) and power signals between the DSEs 22 and the panel 64 (located in the lower rear section of the data storage system 10). Each cable 42 extends from a cable assembly 47 coupled to a panel connector 66, traverses through a portion of the spine 30, and terminates at a spine connector assembly 45. This spine connector assembly 45 connects to a corresponding electrical connector assembly 48 on the DSE 22.

Figure 6:
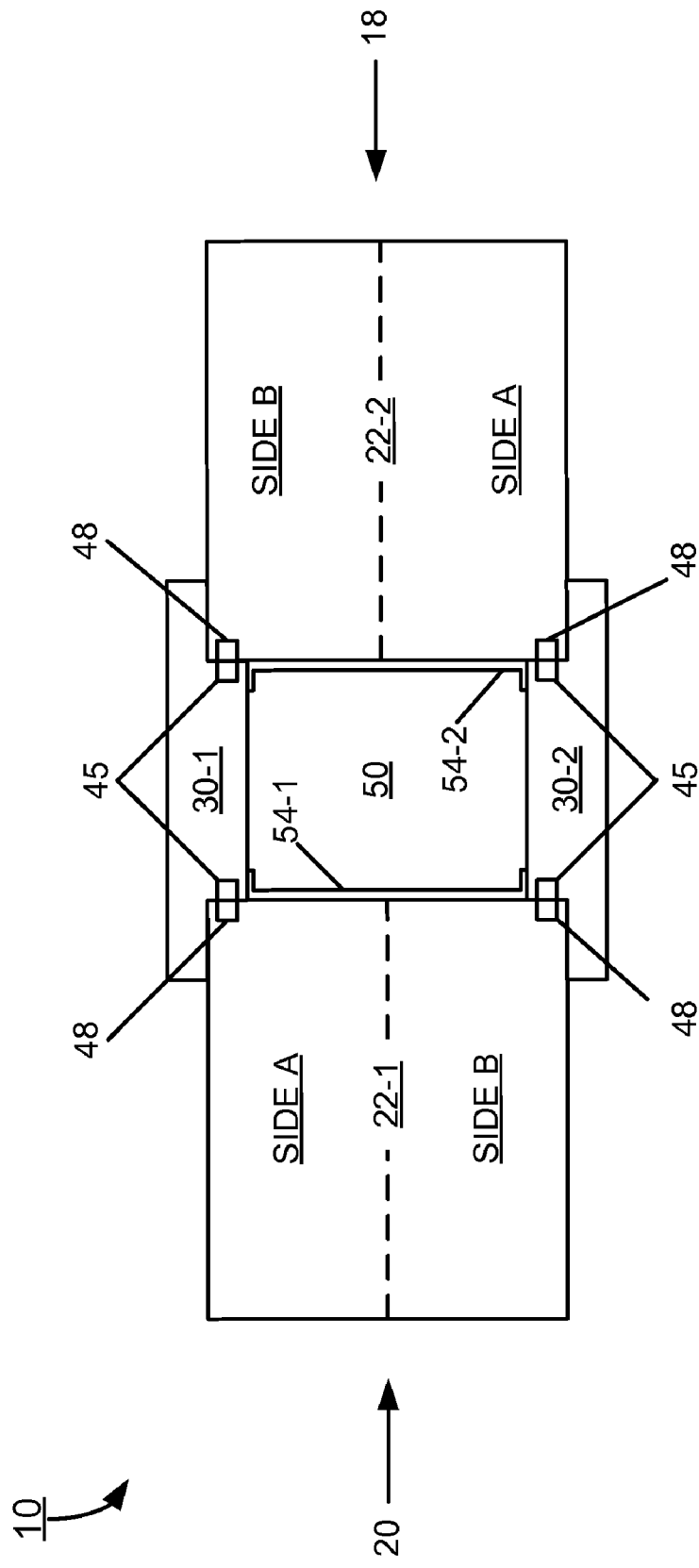
FIG. 6 is a top view of the data storage system, with back-to-back data array enclosures, each electrically plugged into vertical spines on opposite sidewalls of the rack.

FIG. 6 shows a top view of the data storage system 10 having a central chimney 50 separating back-to-back DSEs 22-1, 22-2. In one embodiment, approximately 12" (of central chimney) separates the back-to-back DSEs 22-1, 22-2. Defined on two sides by the opposing interior panels 54-1, 54-2, and on two other sides by the inner-facing walls of opposing spines 30-1, 30-2, the central chimney 50 extends almost the full height of the data storage system 10 and exhausts air through the top.

Each DSE 22 has redundant disk drives partitioned into Side A and Side B. Side A of the DSE 22-1 and Side B of the DSE 22-2 are electrically connected to the spine 30-1 through mated connector assemblies 45, 48. Similarly, Side B of the DSE 22-1 and Side A of the DSE 22-2 are electrically connected to the spine 30-2 through mated connector assemblies 45, 48. It is to be understood that the partitioning is illustrative; the disk drives do not need to be partitioned as shown in FIG. 6. When plugged into the spines 30, the rear side of each DSE 22-1, 22-2 abuts one of the interior panels 54-1, 54-2, forcing open a baffle to permit the passage of air. Each DSE 22 blows air from front-to-rear and exhausts into the central chimney 50 through the open baffle.

Figure 7:
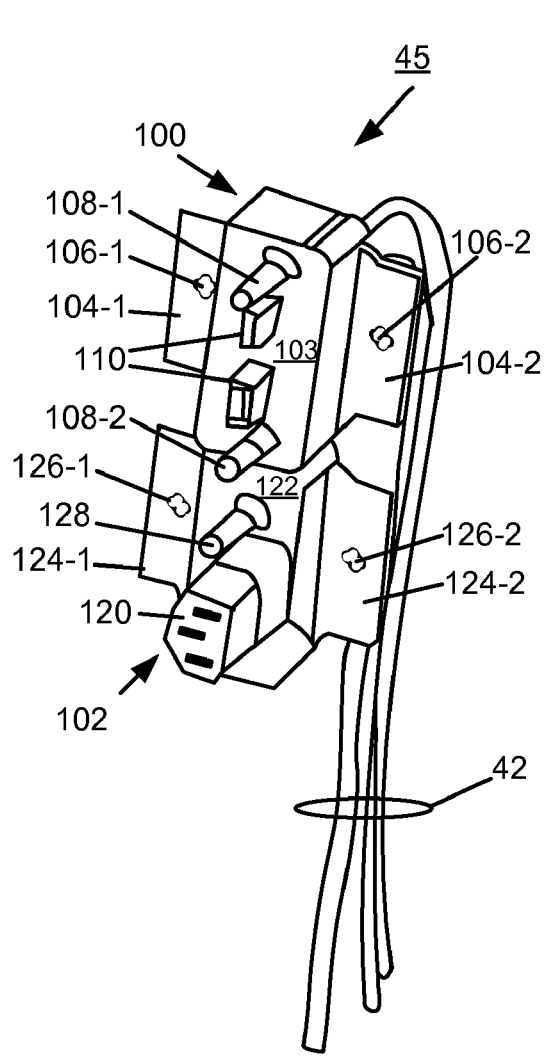
FIG. 7 is a front view of an embodiment of a spine connector assembly.

FIG. 7 shows an embodiment of the spine connector assembly 45 (of FIGS. 5 and 6). The spine connector assembly 45 includes an embodiment of a data signal cable assembly 100 and an embodiment of a power cable assembly 102. Although shown and described hereafter as separate assemblies, the data signal cable assembly 100 and power cable assembly 102 can be constructed integrally as a single cable assembly.

The data signal cable assembly 100 is integrally constructed and has an assembly body 103 and a pair of flanges 104-1, 104-2 (generally, 104) on opposite sides of the assembly body 103. A pair of alignment pins 108-1, 108-2 (generally, 108) and a pair of data signal connectors 110 extend orthogonally from the assembly body 103. Each flange 104-1, 104-2 has a respective cross-shaped opening 106-1, 106-2 (generally, 106) formed therein.

The alignment pins 108 facilitate blind mating between the data signal connectors 110 and corresponding electrical signal connectors of the DSE chassis 22. One alignment pin 108-1 is longer than the other 108-2. The longer alignment pin 108-1 is the first portion of the data signal cable assembly 100 to encounter the back end of the DSE chassis 22 as the chassis slides into the compartment in the rack. In this embodiment, the alignment pins 108 and data signal connectors 110 are arranged vertically (with respect to the chassis), with one alignment pin 108 on either side of the data signal connectors 110. The use of two alignment pins 108 is illustrative; a single alignment pin can suffice for purposes of blind mating.

The data signal connectors 110 conduct data communications to and from the DSE 22. In one embodiment, one of the data signal connectors is a primary port and the other data signal connector is an expansion port of a Fibre Channel or Infiniband® interface. The connector type can be the High-Speed Serial Data Connector (HSSDC2) for Fibre Channel. Other types of data signal connectors may be used in the practice of the invention (e.g., a Small Computer System Interface (SCSI) connector or a modular connector, e.g., any of the Registered Jack or RJ-series connectors). In addition, the data signal cable assembly 100 can have fewer or more than two data signal connectors. Those embodiments of data signal cable assemblies having multiple data signal connectors can be configured to transport different signal types on the same data signal cable assembly (e.g., Fibre Channel and Ethernet).

The power cable assembly 102 is integrally constructed and includes an assembly body 122 and a pair of flanges 124-1, 124-2 (generally, 124) on opposite sides of the assembly body 122. Each flange 124-1, 124-2 has a respective cross-shaped opening 126-1, 126-2 (generally, 126) formed therein. An alignment pin 128 and an electrical plug receptacle 120 extend orthogonally from the assembly body 122. The alignment pin 128 facilitates blind mating between the electrical plug receptacle 120 and a corresponding electrical plug of the DSE chassis 22. The alignment pin 128 can be longer, shorter, or of the same length as the longer of the two alignment pins 108 of the data signal cable assembly 100. In this embodiment, the electrical plug receptacle 120 and alignment pin 128 are disposed vertically (with respect to the chassis), with the alignment pin 128 above the electrical plug receptacle 120.

Figure 8:
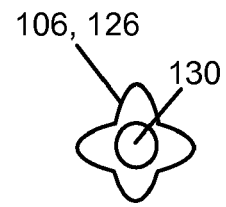
FIG. 8 is a front view of an embodiment of an opening in a flange through which a fastener passes to couple the spine connector assembly movably to the spine.
Figure 9:
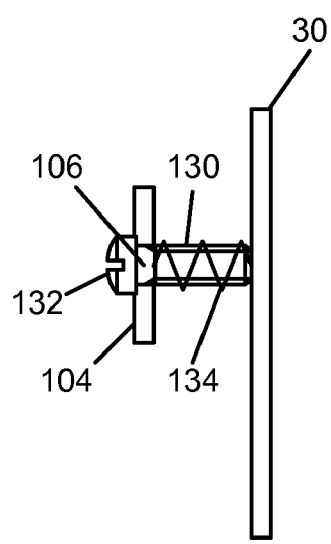
FIG. 9 is a side view of an embodiment of compression means disposed between the flange and the spine.

FIG. 8 shows a general outline of each flange opening 106, 126 in the cable assemblies 100, 102. A cross-section of the shaft 130 of a fastener is shown in the center of the opening 106, 126. The diameter of the shaft 130 relative to the size and shape of the opening 106, 126 allows for side-to-side (X-direction) and up-and-down (Y-direction) movement of the cable assembly when the chassis plugs into the spine 30. Such movement absorbs permitted tolerances in the placement of the electrical connector and electrical plug on the chassis and in the placement of the cable assemblies 100, 102 on the panel of the spine 30. To absorb tolerances in the Z-direction (front-to-back and back-to-front), compression means, such as springs, foam backing, and elastomers, can be placed between the flanges of the cable assemblies and the panel of the spine. For example, FIG. 9 shows a fastener 132 passing through the opening 106 in the flange 104 and penetrating the panel of the spine 30. Coiled around the shaft 130 of the fastener 132, between the flange 104 and the spine panel, is a spring 134.

Figure 10:
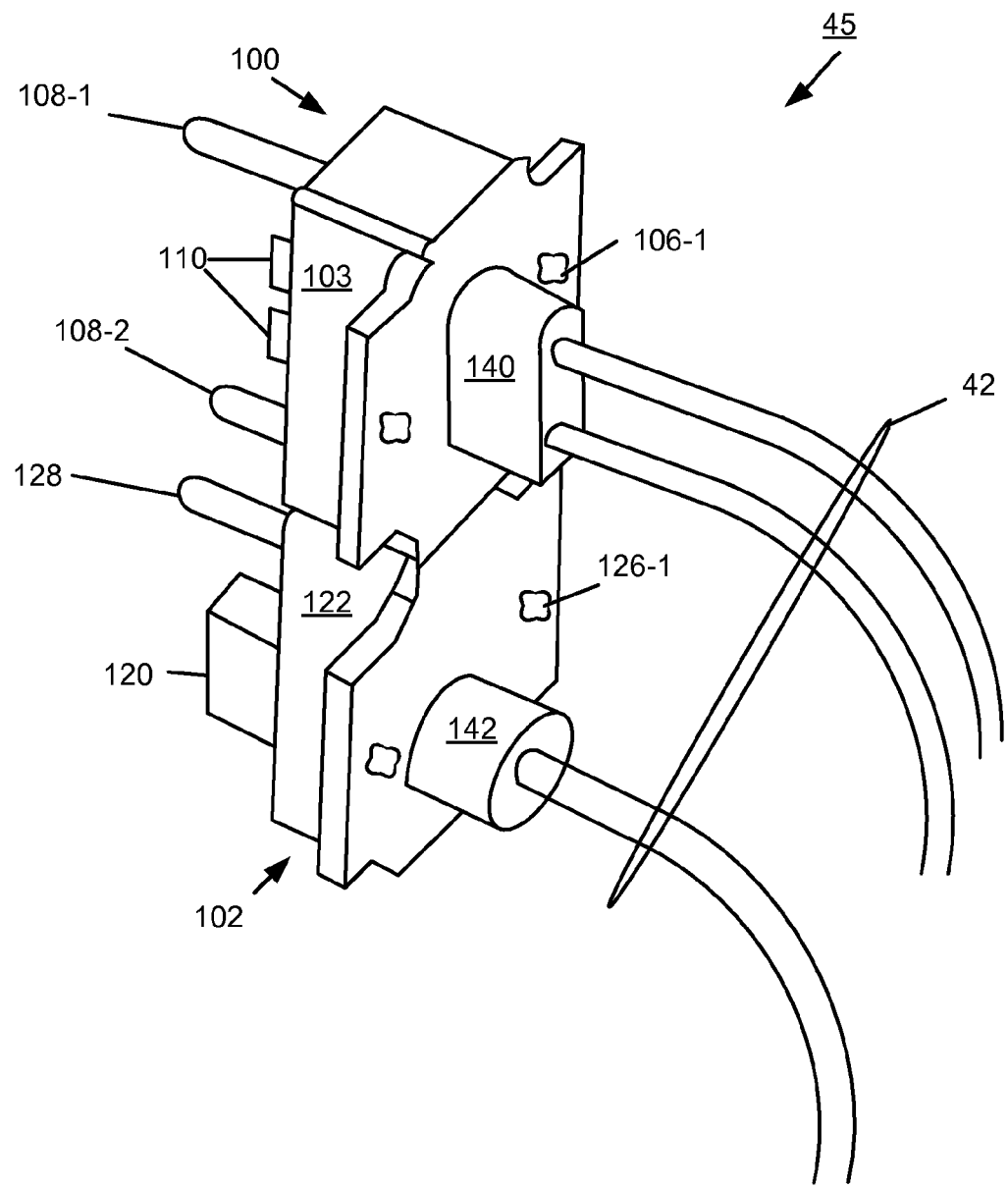
FIG. 10 is a rear view of the spine connector assembly of FIG. 7.

FIG. 10 shows a rear side of the cable assemblies 100, 102 of FIG. 7. Each cable assembly includes an overmold 140, 142, respectively, for securing the cables 42 to the backs thereof. At the other end of the cables 42 (not shown) are cable assemblies with the same or similar structural and functional features as cable assemblies 100, 102, features that facilitate blind mating and hot plugging of the chassis.

Figure 11:
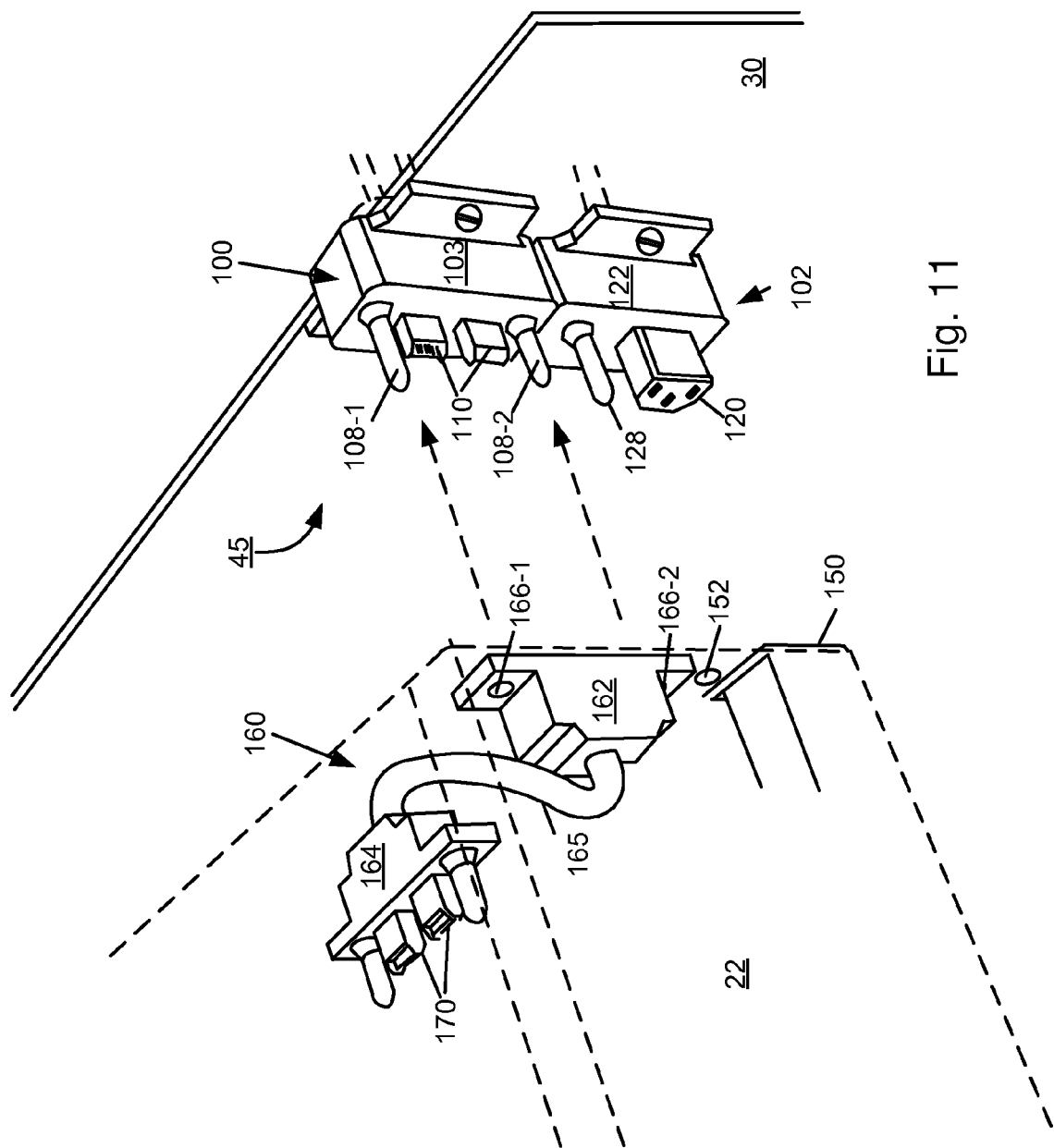
FIG. 11 is an isometric view of a chassis plugging into the spine connector assembly.

FIG. 11 shows a dashed outline of a rear side of a DSE 22 about to join the spine connector assembly 45. The spine connector assembly 45 is movably fixed to a panel portion of the spine 30, while the DSE 22 moves toward the spine connector assembly 45. The DSE 22 includes an electrical plug 150 and a connector assembly interface 160. The electrical plug 150 is aligned to enter the electrical plug receptacle 120 of the power cable assembly 102. Above the electrical plug 150 in the rear face of the DSE 22 is an alignment pin guide 152, which is aligned to receive the alignment pin 128 of the power cable assembly 102.

The connector assembly interface 160 includes a vertically oriented data signal cable assembly 162 connected to a horizontally oriented data signal cable assembly 164 by a cable 165. An LCC (link control card) in the DSE 22—not shown—electrically connects to the data signal cable assembly 100 of the spine connector assembly 45 through the connector assembly interface 160. The vertically oriented data signal cable assembly 162 interfaces with the data signal cable assembly 100; the horizontally oriented data signal cable assembly 164 interfaces with the LCC. In this intermediary position, the connector assembly interface 160, rather than the LCC, absorbs the brunt of the force used to plug the DSE 22 into the spine 30. When the DSE 22 plugs into the spine 30, the data signal cable assembly 162 joins with the data signal cable assembly 100 and the electrical plug 150 joins the electrical plug receptacle 120, concurrently. After the joining, the data signal connectors 170 of the data signal cable assembly 164 conduct the communication signals to and from the corresponding data signal connectors 110 of the data signal cable assembly 100.

Figure 12:
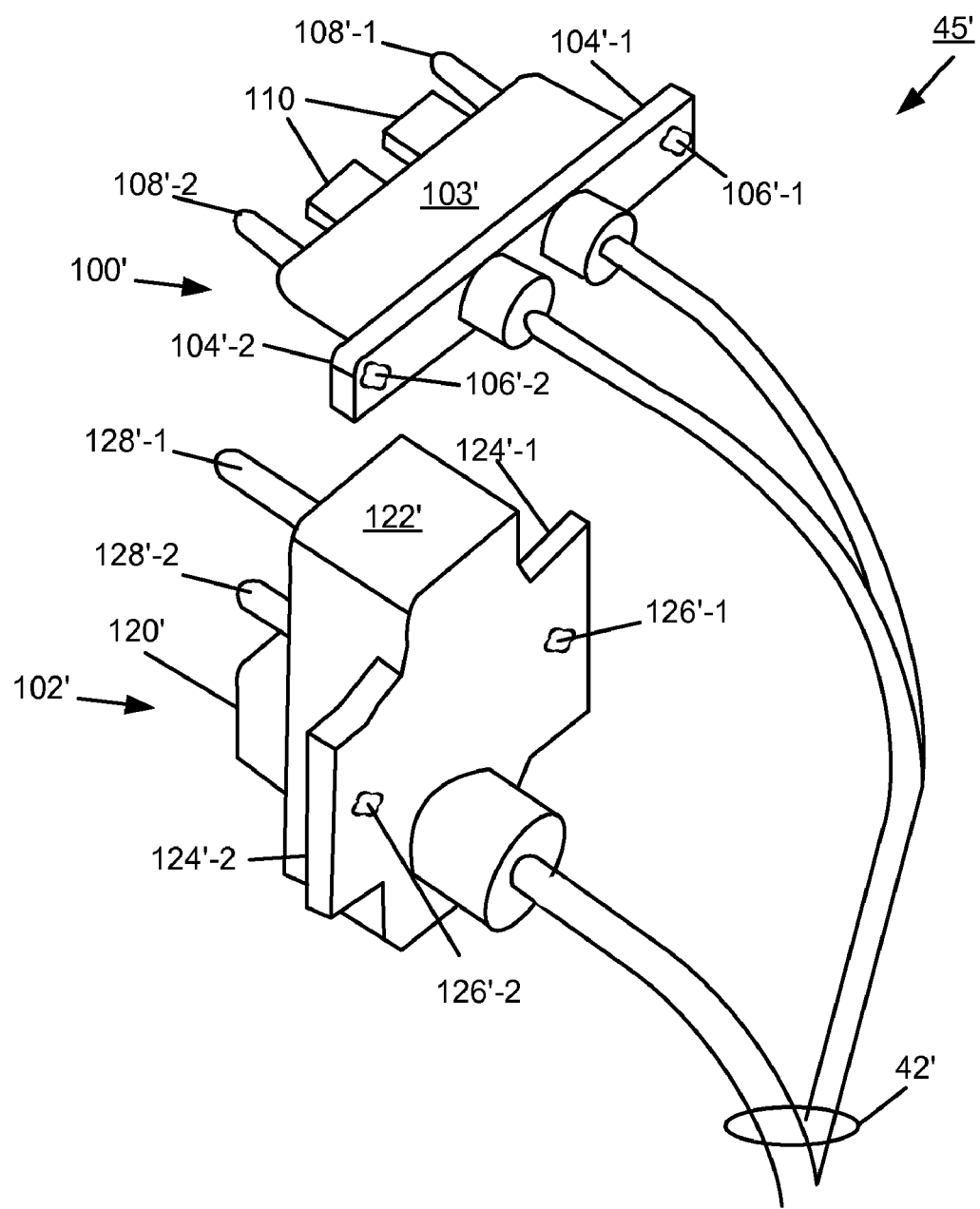
FIG. 12 is a front view of another embodiment of a spine connector assembly.

FIG. 12 shows another embodiment of a spine connector assembly 45' having a data signal cable assembly 100' and a power cable assembly 102'. Although shown and described hereafter as separate assemblies, the data signal cable assembly 100' and power cable assembly 102' can be constructed integrally as a single cable assembly.

The data signal cable assembly 100' is integrally constructed and has an assembly body 103' and a pair of flanges 104'-1, 104'-2 (generally, 104') on opposite sides of the assembly body 103'. A pair of alignment pins 108'-1, 108'-2 (generally, 108') and a pair of data signal connectors 110' extend orthogonally from the assembly body 103'. Each flange 104'-1, 104'-2 has a respective cross-shaped opening 106'-1, 106'-2 (generally, 106') formed therein.

The alignment pins 108' and data signal connectors 110' used in this embodiment of data signal cable assembly 100' are structurally and functionally similar to those described in connection with the data signal cable assembly 100 of FIG. 7. In this embodiment, the alignment pins 108' and data signal connectors 110' are arranged horizontally (with respect to the chassis), with one alignment pin 108' on either side of the data signal connectors 110'.

The power cable assembly 102' is integrally constructed and includes an assembly body 122' and a pair of flanges 124'-1, 124'-2 (generally, 124') on opposite sides of the assembly body 122'. Each flange 124'-1, 124'-2 has a respective cross-shaped opening 126'-1, 126'-2 (generally, 126') formed therein. A pair of alignment pins 128'-1, 128'-2 (generally, 128') and an electrical plug receptacle 120' extend orthogonally from the assembly body 122'. The alignment pin 128'-1 and electrical plug receptacle 120' used in this embodiment of data signal cable assembly 100' are structurally and functionally similar to those described in connection with the data signal cable assembly 100 of FIG. 7. The additional alignment pin 128'-2 further facilitates blind mating. In this embodiment, the electrical plug receptacle 120' and alignment pins 128' are disposed vertically (with respect to the chassis), with the alignment pins 128' above the electrical plug receptacle 120'.

Figure 13:
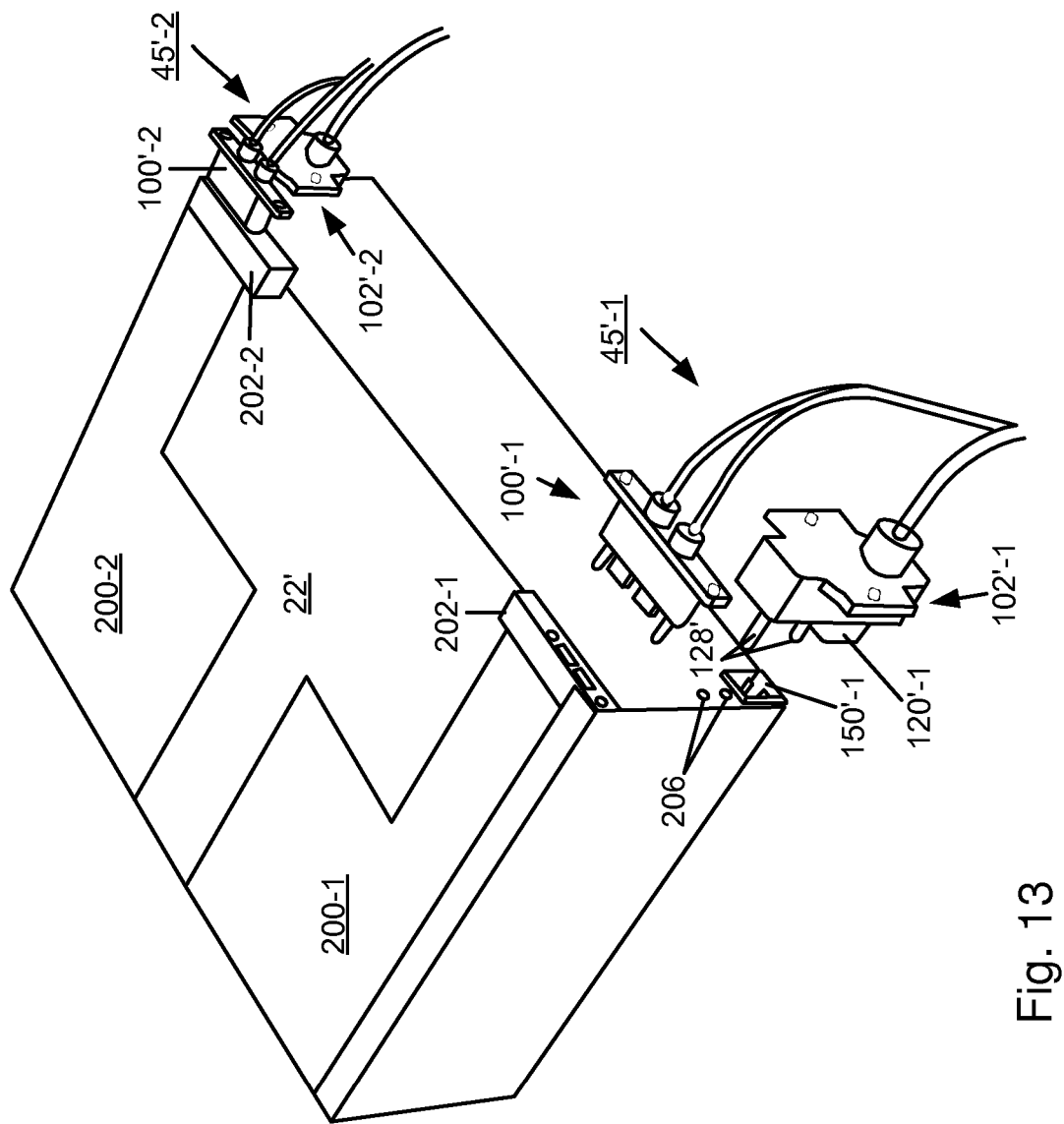
FIG. 13 is a rear view of a chassis plugging into two spine connector assemblies of FIG. 12.

FIG. 13 shows an embodiment of a DSE 22 about to plug into a first spine connector assembly 45'-1 and, for illustration purposes only, already plugged into a second spine connector assembly 45'-2. In practice, the DSE 22' plugs into both spine connector assemblies 45'-1, 45'-2 concurrently when the DSE 22' is installed into the rack. At DSE installation, the spine connector assemblies 45' are movably fixed to opposing spines 30-1, 30-2 (FIG. 6), while the DSE 22' moves toward the spine connector assemblies 45'. The DSE 22' includes an electrical plug 150'-1, 150'-2 (generally 150') and LCCs 200-1, 200-2 (generally, 200). (The electrical plug 150'-2 is obscured by the plugged in power cable assembly 102'-2). Each LCC 200-1, 200-2 has a horizontally oriented data signal connector 202-1, 202-2, respectively, at a back end thereof. The data signal connector 202-1 directly connects to the data signal cable assembly 100'-1 of the spine connector assembly 45'-1; the data signal connector 202-2 directly connects to the data signal cable assembly 100'-2 of the spine connector assembly 45'-2.

The electrical plug 150'-1 is aligned to enter the electrical plug receptacle 120'-1 of the power cable assembly 102'-1. Above the electrical plug 150'-1 in the rear face of the DSE 22' are alignment pin guides 206, which receive the alignment pins 128' of the power cable assembly 102'-1. When the DSE 22' plugs into the spines 30-1, 30-2, the data signal connectors 202-1, 202-2 join with respective data signal cable assemblies 100'-1, 100'-2 and the electrical plugs 150'-1, 150'-2 join respective power cable assemblies 102'-1, 102'-2, concurrently.

Figure 14:
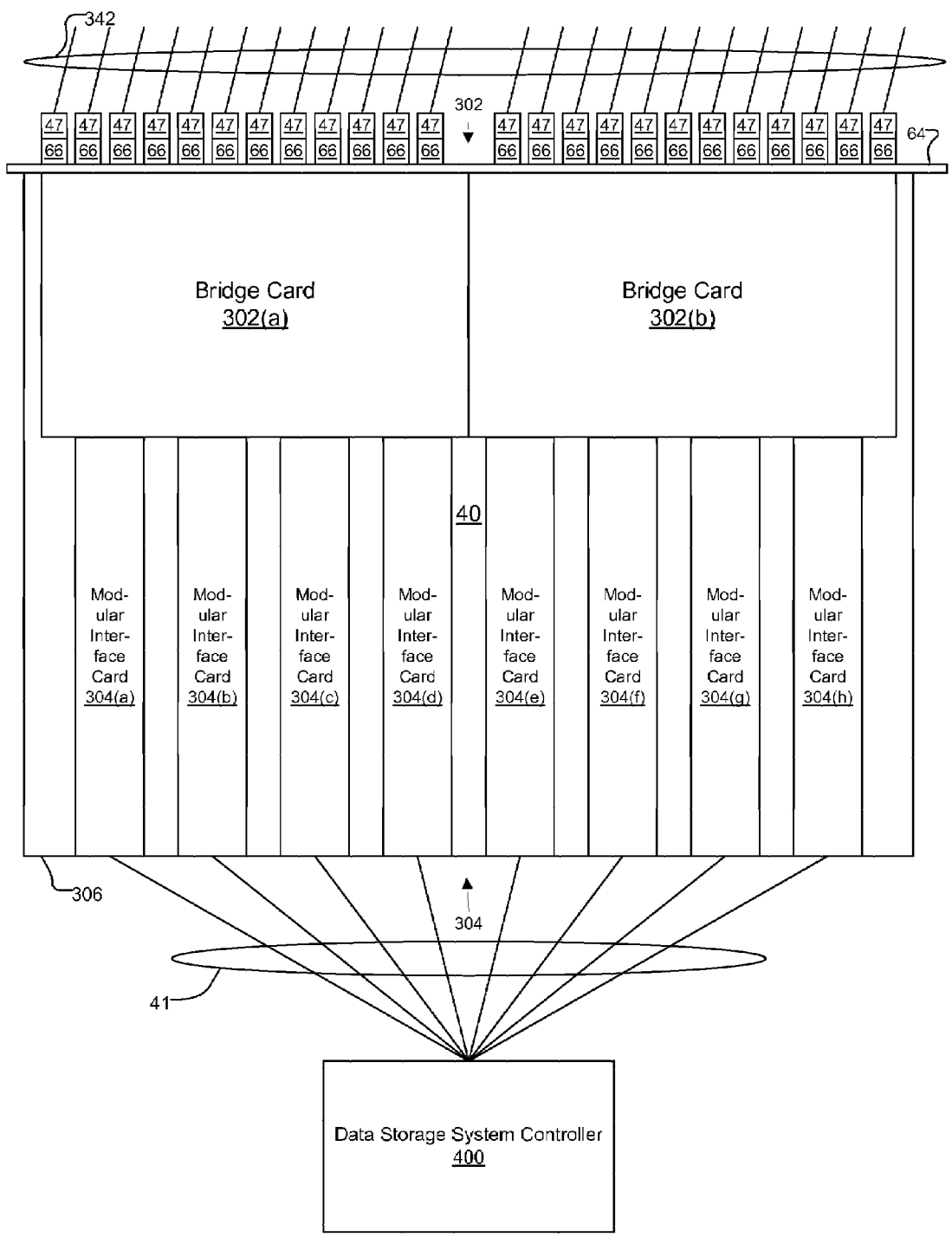
FIG. 14 is top view of one embodiment of a modular patch panel.

FIG. 14 shows an embodiment of a modular patch panel 40. Each data cable 342 from a DSE 22' connects to the connector panel 64 where the cable assembly 47 couples to the electrical connector assembly 66. These data connections directly couple to a bridge card 302 housed within the chassis of the modular patch panel 40. In one embodiment, connections from side A of the various DSEs couple to first bridge card 302(*a*), while connections from side B of the various DSEs couple to the second bridge card 302(*b*). FIG. 14 depicts, by way of example, 12 data connections to each bridge card 302, meaning that 12 DSEs are installed in the system depicted. However, another number of connections could be made (e.g., 22 connections). Each bridge card 302 connects to several modular interface cards 304 which are installed in the modular patch panel 40. For example, as depicted, first bridge card 302(*a*) connects to 4 modular interface cards 304(*a-d*), and second bridge card 302(*b*) connects to 4 modular interface cards 304(*e-h*). The modular interface cards 304, which are installed through the front opening 306 of the modular patch panel (as are the bridge cards 302) in turn connect to a data storage system controller 400 over cabling 41 through the front opening 306.

In some embodiments, the cable assembly 47 that couples to the modular patch panel 40 is identical to the spine connector assembly 45 (FIGS. 7-12). In other embodiments, cable assembly 47 is similar to spine connector assembly 45, but the power cable assembly 102 portion is not present, leaving only the data signal cable assembly 100 portion (FIGS. 7 and 10-11, or 100' in FIG. 12). In the latter set of embodiments, each cable 42 splits towards the bottom of the rack into a separate data cable 342, terminating in the cable assembly 47, and a separate power cable (not shown) which terminates in another cable assembly having only a cable assembly 102 portion for connecting to power regulators 44 via the connector panel 64. In some embodiments, each data cable 342 contains two twisted pairs for transmitting digital signals over differential connections. One twisted pair is for transmission, while the second twisted pair is for receiving. The cable assemblies 47, in that case, would each have four data signal connectors 110.

The bridge cards 302 are situated horizontally within the modular patch panel 40, and the modular interface cards 304 are situated vertically within the modular patch panel 40. This allows for good air flow through the modular patch panel 40. It also allows each bridge card 302 to directly mate with several modular interface cards 304, thereby providing a more robust connection. In some embodiments, the modular interface cards 304 are hot-swappable. In other embodiments, both the modular interface cards 304 and the bridge cards 302 are hot-swappable.

As mentioned above, the DSEs 22 of the data storage system 10 can operate as different kinds of network systems (for example, as a Network Application Storage system, as a Storage Area Network, or as a combination thereof) over different kinds of topologies (for example, point-to-point connections, looped connections, etc.). The particular type of network system depends upon the particular type of data storage system controller 400 that the modular interface cards 304 connect to. In some embodiments, when the type of network system changes (for example, from Network Application Storage to Storage Area Network), the LCCs 200 may simply be reprogrammed or reconfigured to switch network types. In other embodiments, the LCCs 200 must be replaced, requiring each DSE to be removed and reinserted with new LCCs 200.

The topology of the system is controlled by the bridge cards 302. Thus, if the system operates according to the Fibre-Channel Protocol over an Arbitrated Loop (FC-AL), then the topology must be looped, even though each data cable 342 connects directly between the bridge card 302 and a DSE 22 in a point-to-point fashion. In order to accommodate this, the bridge card 302 may logically loop the connections, by first sending a signal to a first DSE 22, the first DSE 22 being instructed to return the signal back to the bridge card 302, and then forwarding the returned signal on towards a second DSE 22, the second DSE 22 also being instructed to return the signal back to the bridge card 302, and so on, until the signal has looped through all the DSEs 22 connected to the bridge card 302. In some embodiments, each bridge card 302 may simply be reprogrammed or reconfigured to adapt a change in topology. In other embodiments, each bridge card 302 must be replaced to adapt the topology. The bridge cards 302 also serve to switch signals between the DSEs 22 and the modular interface cards 304. Thus, suppose each bridge card 302 connects to 22 DSEs 22 and to 4 modular interface cards 304. Thus, it is obvious that more than one DSE 22 must connect to at least one modular interface card 304. In some embodiments, signals are switched between all the DSEs 22 and all the modular interface cards 304. In other embodiments, each modular interface card 304 controls a subset of the DSEs 22, so the switching for each modular interface card 304 is done, for example, between 5 or 6 DSEs 22.

As mentioned above, the cabling 41 (and low-level operation of the system) can vary (for example, SAS, fibre, Ethernet, etc.). Thus, each modular interface card 304, physically conveys the signals between each DSE 22 and the data storage system controller 400. Thus, if the data storage system controller 400 uses Ethernet interfaces for communication, then the modular interface cards must be Ethernet cards capable of transmitting signals to and from the data storage system controller 400 via the Ethernet protocol over Ethernet cabling (e.g., Cat-5e cable). If the data storage system controller 400 is upgraded (or otherwise modified) to utilize a different kind of interface (e.g., SAS), then the Ethernet cards within the modular patch panel must be replaced with different cards (e.g., SAS cards). Thus, both the bridge cards 302 and the modular interface cards 304 are interchangeable through an opening 306 at the front end of the modular patch panel 40 (which is at the rear side 18 of the rack 14).

While various embodiments of the invention have been particularly shown and described, it will be understood by those skilled in the art that various changes in form and details may be made therein without departing from the spirit and scope of the invention as defined by the appended claims.

For example, the DSEs 22 have been described as being disk array enclosures. However, other sorts of data storage enclosures may be used instead. For example, the data storage devices within the DSEs 22 may be solid-state data storage devices based on flash memory.

What is claimed is:

1. A modular patch panel to interconnect a data storage system controller to data storage enclosures, the modular patch panel comprising:
   a chassis having a front end and a back end, the front end and the back end being horizontally opposed, the back end attaching to a panel portion of a rack system, the panel portion electrically connecting to the data storage enclosures over a set of point-to-point connections; and
   modular interface circuitry, the modular interface circuitry:
      having a data storage interface portion electrically connected to the set of point-to-point connections through the panel;
      having a controller interface portion electrically connecting to the data storage system controller through the front end;
      being interchangeable through an opening in the front end; and
      being constructed and arranged to manage digital communications between the data storage system controller and the data storage enclosures according to a data storage system protocol used by the data storage system controller.

2. A modular patch panel as in claim 1 wherein the modular interface circuitry includes:
   a first bridge card electrically connected to the set of point-to-point connections through the panel; and
   a plurality of modular interface cards, the plurality of modular interface cards conveying digital signals from the data storage enclosures, received via the first bridge card, to the data storage system according to a communication protocol used by the data storage system controller and conveying digital signals from the data storage system controller to the data storage enclosures through the first bridge card;
   wherein the first bridge card switches digital signals between the data storage enclosures and the plurality of modular interface cards.

3. A modular patch panel as in claim 2 wherein:
   the set of point-to-point connections includes a first point-to-point connection to each data storage enclosure of the plurality of data storage enclosures and a second point-to-point connection to each data storage enclosure of the plurality of data storage enclosures, the first and second point-to-point connections to each data storage enclosure being redundant;
   the modular interface circuitry further comprises a second bridge card electrically connected to the data storage enclosures;
   the first bridge card electrically connects to each data storage enclosure over the respective first point-to-point connections of each data storage enclosure;
   the second bridge card electrically connects to each data storage enclosure over the respective second point-to-point connections of each data storage enclosure; and
   the second bridge card switches digital signals between the data storage enclosures and the plurality of modular interface cards.

4. A modular patch panel as in claim 2 wherein the first bridge card is placed horizontally within the modular patch panel and the plurality of modular interface cards are placed vertically within the modular patch panel to provide a direct connection between the first bridge card and the plurality of modular interface cards.

5. A modular patch panel as in claim 2 wherein the plurality of modular interface cards are interchangeable for a plurality of alternative modular interface cards, the plurality of alternative modular interface cards being constructed and arranged to:
   convey digital signals from the data storage enclosures, received via the first bridge card, to an alternative data storage system controller according to an alternative communication protocol used by the alternative data storage system controller which may electrically connect to the plurality of modular interface cards through the front end; and
   convey digital signals from the alternative data storage system controller to the data storage enclosures through the first bridge card.

6. A modular patch panel as in claim 2 wherein the first bridge card establishes a topology of the connections between the data storage enclosures and the modular interface cards.

7. A modular patch panel as in claim 1 wherein the point-to-point connections of the set of point-to-point connections are provided over twisted pair cables using differential signals.

8. A modular patch panel as in claim 1 wherein:
the panel portion:
is mounted on the rack system below a set of data storage enclosures;
is substantially planar in shape; and
includes a plurality of electrical connector assemblies mounted thereon, the plurality of electrical connector assemblies connecting the set of point-to-point connections to the data storage interface portion;
the data storage interface portion is electrically connects to the controller interface portion; and
the data storage system controller:
is external to the modular interface circuitry;
is external to the chassis; and
connects to the controller interface portion over external cables.

9. A rack-mounted data storage system comprising:
a rack having opposing sidewalls, an open forward side, an open rear side, forward compartments for holding chassis received through the front side, and rear compartments for holding chassis received through the rear side;
a cable conduit mounted to one of the sidewalls of the rack between the front and rear compartments, the cable conduit having an upper region with an electrical connector assembly coupled thereto;
a plurality of data storage enclosures each housing a plurality of disk drives, each data storage enclosure residing in one of the compartments of the rack and having an electrical connector assembly that plugs into the electrical connector assembly of the cable conduit;
a panel portion mounted parallel to and below one of the sidewalls, the panel portion electrically coupling to the plurality of data storage enclosures via the electrical connector assembly of the cable conduit over point-to-point connections; and
a modular patch panel residing in one of the compartments of the rack, the modular patch panel including:
a chassis having a front end and a back end, the front end and the back end being horizontally opposed, the back end attaching to the panel portion; and
modular interface circuitry, the modular interface circuitry:
having a data storage interface portion electrically connected to the point-to-point connections through the panel;
having a controller interface portion electrically connecting to a data storage system controller through the front end;
being interchangeable through an opening in the front end; and
being constructed and arranged to manage digital communications between the data storage system controller and the data storage enclosures according to a data storage system protocol used by the data storage system controller.

10. A rack-mounted data storage system as in claim 9 wherein the modular interface circuitry includes:
a first bridge card electrically connected to the point-to-point connections through the panel; and
a plurality of modular interface cards, the plurality of modular interface cards conveying digital signals from the data storage enclosures, received via the first bridge card, to the data storage system according to a communication protocol used by the data storage system controller and conveying digital signals from the data storage system controller to the data storage enclosures through the first bridge card;
wherein the first bridge card switches digital signals between the data storage enclosures and the plurality of modular interface cards.

11. A rack-mounted data storage system as in claim 10 wherein:
the point-to-point connections includes a first point-to-point connection to each data storage enclosure of the plurality of data storage enclosures and a second point-to-point connection to each data storage enclosure of the plurality of data storage enclosures, the first and second point-to-point connections to each data storage enclosure being redundant;
the modular interface circuitry further comprises a second bridge card electrically connected to the plurality of data storage enclosures;
the first bridge card electrically connects to each data storage enclosure over the respective first point-to-point connections of each data storage enclosure;
the second bridge card electrically connects to each data storage enclosure over the respective second point-to-point connections of each data storage enclosure; and
the second bridge card switches digital signals between the data storage enclosures and the plurality of modular interface cards.

12. A rack-mounted data storage system as in claim 10 wherein the first bridge card is placed horizontally within the modular patch panel and the plurality of modular interface cards are placed vertically within the modular patch panel to provide a direct connection between the first bridge card and the plurality of modular interface cards.

13. A rack-mounted data storage system as in claim 10 wherein the plurality of modular interface cards are interchangeable for a plurality of alternative modular interface cards, the plurality of alternative modular interface cards being constructed and arranged to:
convey digital signals from the plurality of data storage enclosures, received via the first bridge card, to an alternative data storage system controller according to an alternative communication protocol used by the alternative data storage system controller which may electrically connect to the plurality of modular interface cards through the front end; and
convey digital signals from the alternative data storage system controller to the plurality of data storage enclosures through the first bridge card.

14. A rack-mounted data storage system as in claim 10 wherein the first bridge card establishes the topology of the connections between the plurality of data storage enclosures and the modular interface cards.

15. A rack-mounted data storage system as in claim 9 wherein the point-to-point connections are provided over twisted pair cables using differential signals.

16. A method for interconnecting a data storage system controller to data storage enclosures mounted on a rack, the method comprising
installing a modular patch panel in the rack, the modular patch panel having:
a chassis having a front end and a back end, the front end and the back end being horizontally opposed, the back end attaching to a panel portion of a rack system, the panel portion electrically connecting to the data storage enclosures over a set of point-to-point connections; and modular interface circuitry, the modular interface circuitry being interchangeable through an opening in the front end;

electrically connecting a data storage interface portion of the modular patch panel to the set of point-to-point connections through the panel;

electrically connecting controller interface portion of the modular patch panel to the data storage system controller through the front end; and configuring the modular interface circuitry to manage digital communications between the data storage system controller and the data storage enclosures according to a data storage system protocol used by the data storage system controller.

17. A method as in claim 16 wherein configuring the modular interface circuitry to manage digital communications includes:

electrically connecting a first bridge card to the set of point-to-point connections through the panel;

electrically connecting a plurality of modular interface cards to the first bridge card;

conveying, through the modular interface card, digital signals from the data storage enclosures, received via the first bridge card, to the data storage system according to a communication protocol used by the data storage system controller and conveying digital signals from the data storage system controller to the data storage enclosures through the first bridge card; and switching digital signals between the data storage enclosures and the plurality of modular interface cards within the first bridge card.

18. A method as in claim 17 wherein the plurality of modular interface cards are interchangeable for a plurality of alternative modular interface cards, the plurality of alternative modular interface cards being constructed and arranged to:

convey digital signals from the data storage enclosures, received via the first bridge card, to an alternative data storage system controller according to an alternative communication protocol used by the alternative data storage system controller which may electrically connect to the plurality of modular interface cards through the front end; and convey digital signals from the alternative data storage system controller to the data storage enclosures through the first bridge card.

19. A method as in claim 17 wherein switching digital signals includes establishing a topology of the connections between the data storage enclosures and the modular interface cards.

20. A method as in claim 16 wherein the point-to-point connections of the set of point-to-point connections are provided over twisted pair cables using differential signals.

* * * * *